United States Patent
Yoshida

(10) Patent No.: US 8,899,669 B2
(45) Date of Patent: Dec. 2, 2014

(54) RESIN ROOF PANEL STRUCTURE

(75) Inventor: Eiji Yoshida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/976,718

(22) PCT Filed: Jan. 12, 2011

(86) PCT No.: PCT/JP2011/050377
§ 371 (c)(1),
(2), (4) Date: Jun. 27, 2013

(87) PCT Pub. No.: WO2012/095969
PCT Pub. Date: Jul. 19, 2012

(65) Prior Publication Data
US 2013/0285417 A1    Oct. 31, 2013

(51) Int. Cl.
*B62D 25/06* (2006.01)
*B62D 29/04* (2006.01)
*B62D 29/00* (2006.01)

(52) U.S. Cl.
CPC .............. *B62D 25/06* (2013.01); *B62D 29/04* (2013.01); *B62D 29/005* (2013.01); *B62D 29/043* (2013.01)
USPC ....................... 296/210; 296/181.1

(58) Field of Classification Search
CPC .... B62D 25/06; B62D 27/026; B62D 29/005; B62D 29/04; B62D 29/043; B62D 29/048
USPC ................. 296/181.2, 191, 210, 218
See application file for complete search history.

(56) References Cited

U.S. PATENT DOCUMENTS

| | | | | |
|---|---|---|---|---|
| 4,355,845 A | * | 10/1982 | Ziegler et al. | 296/210 |
| 4,475,765 A | * | 10/1984 | Vogt et al. | 296/210 |
| 6,321,495 B1 | * | 11/2001 | Oami | 52/208 |
| 6,347,829 B1 | * | 2/2002 | Hanyu | 296/210 |
| 2004/0169400 A1 | * | 9/2004 | Langhoff et al. | 296/191 |
| 2005/0104418 A1 | * | 5/2005 | Zirbs | 296/210 |
| 2011/0101731 A1 | * | 5/2011 | Legler et al. | 296/181.2 |

FOREIGN PATENT DOCUMENTS

| | | | |
|---|---|---|---|
| DE | 3420781 A | * | 1/1985 |
| JP | U-57-171972 | | 10/1982 |
| JP | U-59-160466 | | 10/1984 |
| JP | U-61-78076 | | 5/1986 |
| JP | U-3-83183 | | 8/1991 |
| JP | U-4-84057 | | 7/1992 |
| JP | A-10-310083 | | 11/1998 |
| JP | A-2008-68765 | | 3/2008 |

* cited by examiner

*Primary Examiner* — Glenn Dayoan
*Assistant Examiner* — Jason S Daniels
(74) *Attorney, Agent, or Firm* — Oliff PLC

(57) ABSTRACT

To obtain a vehicular panel structure that can suppress changes in angles between vehicle frame members.

Ribs (30) and (32) are formed in each corner portion on an undersurface side of a roof panel (28) in such a way as to straddle headers (38) and roof side rails (12). Engaging holes (34) are formed in both lengthwise direction end sides of each of the ribs (30) and (32), and weld nuts (36) disposed on the headers (38) and the roof side rails (12) are engaged with the engaging holes (34).

13 Claims, 8 Drawing Sheets

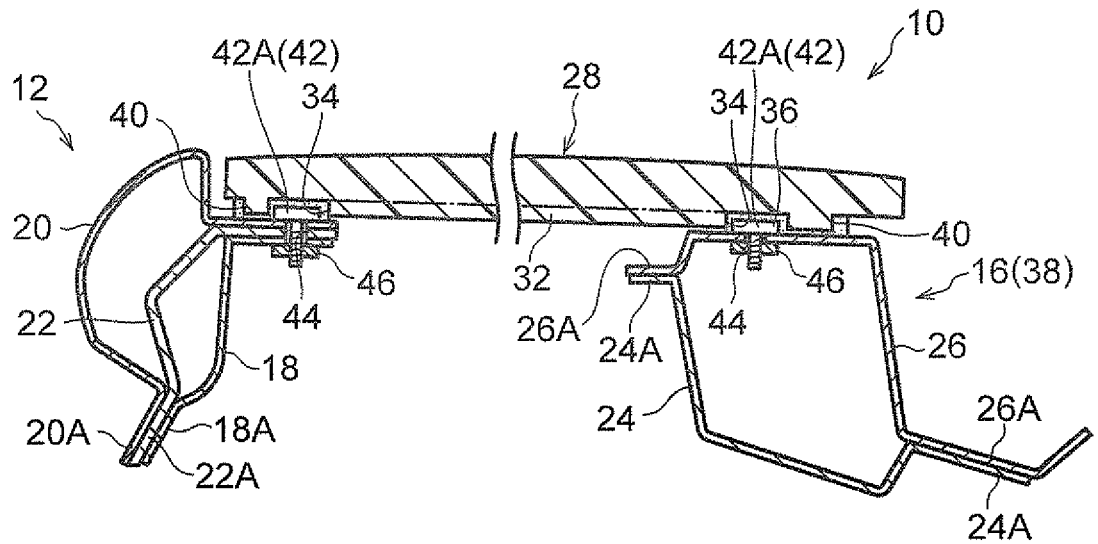
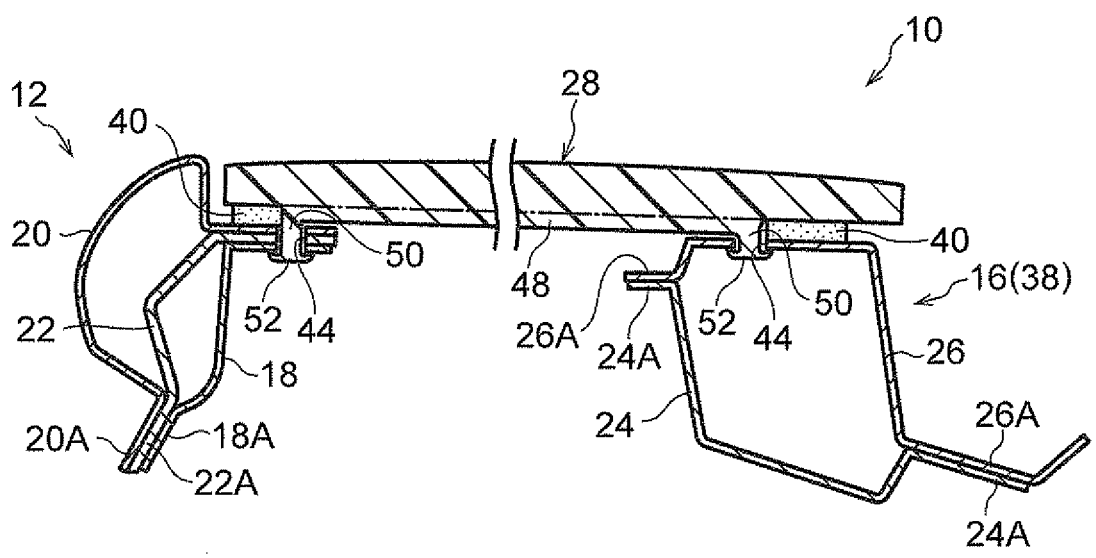

RESIN ROOF PANEL STRUCTURE

TECHNICAL FIELD

The present invention relates to a vehicular panel structure for a roof panel or a hood.

BACKGROUND ART

Conventionally, the technique of using resin to mold a vehicular panel member for the purpose of reducing the weight of a vehicle has been known. A left and right pair of roof side rails are disposed extending in a vehicle front-and-rear direction on both vehicle width direction end portions of a roof portion positioned on the upper portion of the vehicle, and a front header and a rear header disposed extending in the vehicle width direction are joined to front end portions and rear end portions, respectively, of the roof side rails.

For example, in patent document 1, a resin roof panel is joined to metal vehicle frame members, such as the front header, the rear header, and the roof side rails. Ribs are formed on an undersurface side (the opposite side of the design surface) of the roof panel along the vehicle front-and-rear direction on both end sides in the vehicle width direction, and because of this, the rigidity of the roof panel is raised.
Patent Document 1: JP-A No. 2008-68765

DISCLOSURE OF INVENTION

Technical Problem

Here, the front header and rear header are joined to the roof side rails in such a way as to form substantial right angles as seen in a vehicle plan view, but this prior art does not have the function of maintaining the angles formed by either the front header or the rear header with the roof side rails.

In consideration of the circumstances described above, it is an object of the present invention to obtain a vehicular panel structure that can suppress changes in angles between vehicle frame members.

Solution to Problem

A first aspect of the present invention provides a vehicular panel structure applied to a vehicle equipped with a pair of side members that configure a vehicle frame member and are disposed extending along a vehicle front-and-rear direction or a vehicle up-and-down direction and cross members that configure the vehicle frame member, are disposed extending along a vehicle width direction, and bridge the pair of side members, the vehicular panel structure comprising: a resin panel member that is joined to the vehicle frame member; and high-rigidity portions that are disposed on the panel member in positions straddling the side members and the cross members and are higher in rigidity than other sections of the panel member.

In this aspect, the resin panel member is joined to the vehicle frame member configured to include the pair of side members that are disposed extending along the vehicle front-and-rear direction or the vehicle up-and-down direction and the cross members that are disposed extending along the vehicle width direction and bridge the pair of side members. Here, examples of the "panel member" include a roof panel, a hood, and a back door.

Additionally, the high-rigidity portions that are higher in rigidity than the other sections of the panel member are disposed on the panel member in positions straddling the side members and the cross members. Here, examples of "on the panel member in positions straddling the side members and the cross members" include a case where the high-rigidity portions enter in between the side members and the cross members and a case where the high-rigidity portions interconnect the side members and the cross members. In the former case, in a case where a compressive load has acted between the side members and the cross members, a reaction force with respect to the compressive load can be obtained with the high-rigidity portions. In the latter case, in a case where a compressive load or a tensile load has acted between the side members and the cross members, a reaction force with respect to the compressive load or the tensile load can be obtained with the high-rigidity portions.

In a case where a compressive load or a tensile load has acted between the side members and the cross members, the side members or the cross members try to deform in the direction in which the angles formed by the side members and the cross members become narrower or the direction in which the angles formed by the side members and the cross members become wider, but because a reaction force with respect to the compressive load or the tensile load is obtained with the high-rigidity portions, even when resin is used for the panel member, the angles formed by the side members and the cross members become maintained via the high-rigidity portions disposed on the panel member. Consequently, changes in the angles between the side members and the cross members are prevented or suppressed.

Additionally, by disposing the high-rigidity portions on the panel member as described above, vehicle rigidity becomes higher and steering stability and NV performance improve. Further, because vehicle rigidity becomes higher, even if one side of the vehicle were to run over a bump during travel, torsional deformation of the vehicle via the vehicle frame member is prevented or suppressed.

A second aspect of the present invention is the first aspect of the present invention, wherein the high-rigidity portions may be ribs that have been made thicker than the thickness of other sections of the panel member.

According to this configuration, the high-rigidity portions are ribs disposed on the panel member. The ribs may be molded separately from the panel member and thereafter integrated with the panel member, or the ribs may be molded integrally with the panel member. In the former case, secondary processing such as integrating the two parts becomes necessary, but materials differing between the ribs and the panel member can be used. In the latter case, moldability is good because it suffices just to dispose the ribs on the panel member, and a reduction in cost can be achieved because secondary processing such as integrating the two parts is unnecessary.

A third aspect of the present invention is the second aspect of the present invention, wherein engaging portions that engage with engaged portions disposed on the side members and the cross members may be disposed in the ribs.

According to this configuration, the engaged portions are disposed on the side members and the cross members, and the engaging portions that engage with the engaged portions are disposed in the ribs. For this reason, by causing the engaged portions of the side members and the cross members to engage with the engaging portions of the panel member to engage with each other, the side members and the cross members become interconnected and reinforced by the ribs. Because of this, even when resin is used for the panel member, the angles formed by the side members and the cross members become maintained via the ribs, and changes in the angles between the side members and the cross members are prevented or suppressed.

Here, regarding changes in the angles between the side members and the cross members, in addition to the angles between the side members and the cross members as seen in a vehicle plan view, the same is also true regarding the angles between the side members and the cross members as seen in a vehicle side view, and torsional deformation of the vehicle via the vehicle frame member is prevented or suppressed.

A fourth aspect of the present invention is the third aspect of the present invention, wherein the engaged portions may be head portions disposed on through members that penetrate and are retained in through holes formed in the side members or the cross members, with the head portions projecting from surfaces of the side member or the cross members, and the engaging portions may be recessed portions into which the head portions are inserted.

According to this configuration, the through members penetrate and are retained in the through holes formed in the side members or the cross members. The head portions of the through members project from the surfaces of the side members or the cross members, and the head portions are inserted into the recessed portions disposed in the ribs. The through members are retained with respect to the side members or the cross members, so in a state in which the head portions of the through members have been inserted into the recessed portions in the ribs, uplift of the panel member can be prevented or suppressed via the through members because the head portions and the recessed portions are secured.

A fifth aspect of the present invention is the third aspect of the present invention, wherein the engaged portions may be peripheral edge portions of through holes formed in the side members or the cross members, and the engaging portions may be projections that penetrate the through holes and are locked on the peripheral edge portions of the through holes.

According to this configuration, by giving the invention a configuration where the projections are disposed on the ribs, penetrate the through holes formed in the side members or the cross members, and are locked on the peripheral edge portions of the through holes, the projections become retained with respect to the side members or the cross members. For this reason, uplift of the panel member can be prevented or suppressed via the projections.

A sixth aspect of the present invention is any one of the first to fifth aspects of the present invention, wherein the side members may be disposed extending in the vehicle front-and-rear direction, and the panel member may be a roof panel.

According to this configuration, in a case where panel member is a roof panel, torsional deformation of the cabin can be prevented or suppressed.

A seventh aspect of the present invention is any one of the second to sixth aspects of the present invention, wherein an adhesive may be applied to lengthwise direction outer sides of the ribs.

According to this configuration, in a case where a tensile load has acted on the ribs via the engaged portions and the engaging portions, a reaction force with respect to the tensile load can be obtained with the adhesive.

An eighth aspect of the present invention is any one of the first to seventh aspects of the present invention, wherein the cross members may be configured to include a front header portion placed on a front end portion of the resin roof panel and a rear header portion placed on a rear end portion of the resin roof panel, and the high-rigidity portions may be disposed at least on the rear header portion.

According to this configuration, the cross members are configured to include the front header portion placed on the front end portion of the resin roof panel and the rear header portion placed on the rear end portion of the resin roof panel. In a sedan type of vehicle, there are few differences in deformation between the vehicle front side and the vehicle rear side of the vehicle frame member configuring the vehicle roof portion, but in a hatchback type of vehicle, the vehicle rear side of the vehicle frame member tends to deform more easily than the vehicle front side of the vehicle frame member. For this reason, by reinforcing at least the rear header portion side, changes in angles between vehicle frame members can be suppressed with the necessary minimum configuration.

Advantageous Effects of Invention

As described above, according to the first aspect of the present invention, the first aspect has the excellent effect that changes in angles between vehicle frame members can be suppressed.

According to the second aspect of the present invention, the second aspect has the excellent effect that a reduction in cost can be achieved by molding the high-rigidity portions integrally with the panel member.

According to the third aspect of the present invention, the third aspect has the excellent effect that changes in angles between vehicle frame members can be suppressed with a simple configuration.

According to the fourth aspect of the present invention, the fourth aspect has the excellent effect that uplift of the panel member can be suppressed.

According to the fifth aspect of the present invention, the fifth aspect has the excellent effect that a reduction in cost can be achieved.

According to the sixth aspect of the present invention, the sixth aspect has the excellent effect that the function of suppressing changes in angles between vehicle frame members can be sufficiently exhibited.

According to the seventh aspect of the present invention, the seventh aspect has the excellent effect that the reaction force with respect to a tensile load can be increased.

According to the eighth aspect of the present invention, the eighth aspect has the excellent effect that suppressing changes in angles between vehicle frame members can be obtained at a low cost.

BRIEF DESCRIPTION OF DRAWINGS

FIG. 5 is a cross-sectional view corresponding to FIG. 3 showing another embodiment (1) of the vehicular roof structure pertaining to the embodiment;

FIG. 6 is a cross-sectional view corresponding to FIG. 3 showing another embodiment (2) of the vehicular roof structure pertaining to the embodiment;

BEST MODE FOR CARRYING OUT THE INVENTION

Figure 1:
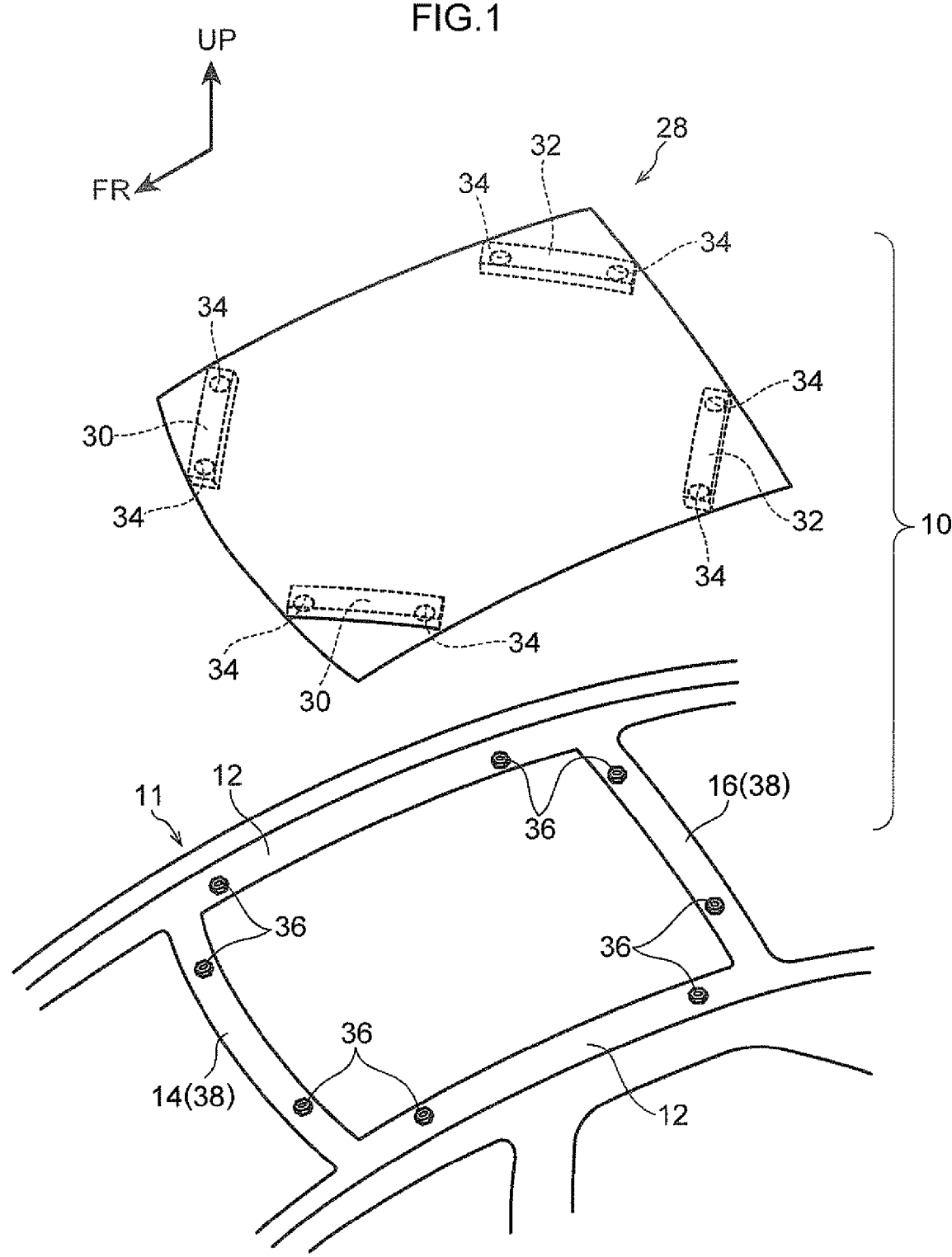
FIG. 1 is a schematic exploded perspective view of a vehicular frame member and a roof panel of a vehicular roof structure pertaining to an embodiment.

An embodiment of a vehicular panel structure pertaining to the present invention will be described below using FIG. 1 to FIG. 4. In the drawings, arrow FR represents a front direction in a vehicle front-and-rear direction and arrow UP represents an up direction in a vehicle up-and-down direction.

Configuration of Vehicular Roof Structure

Figure 2:
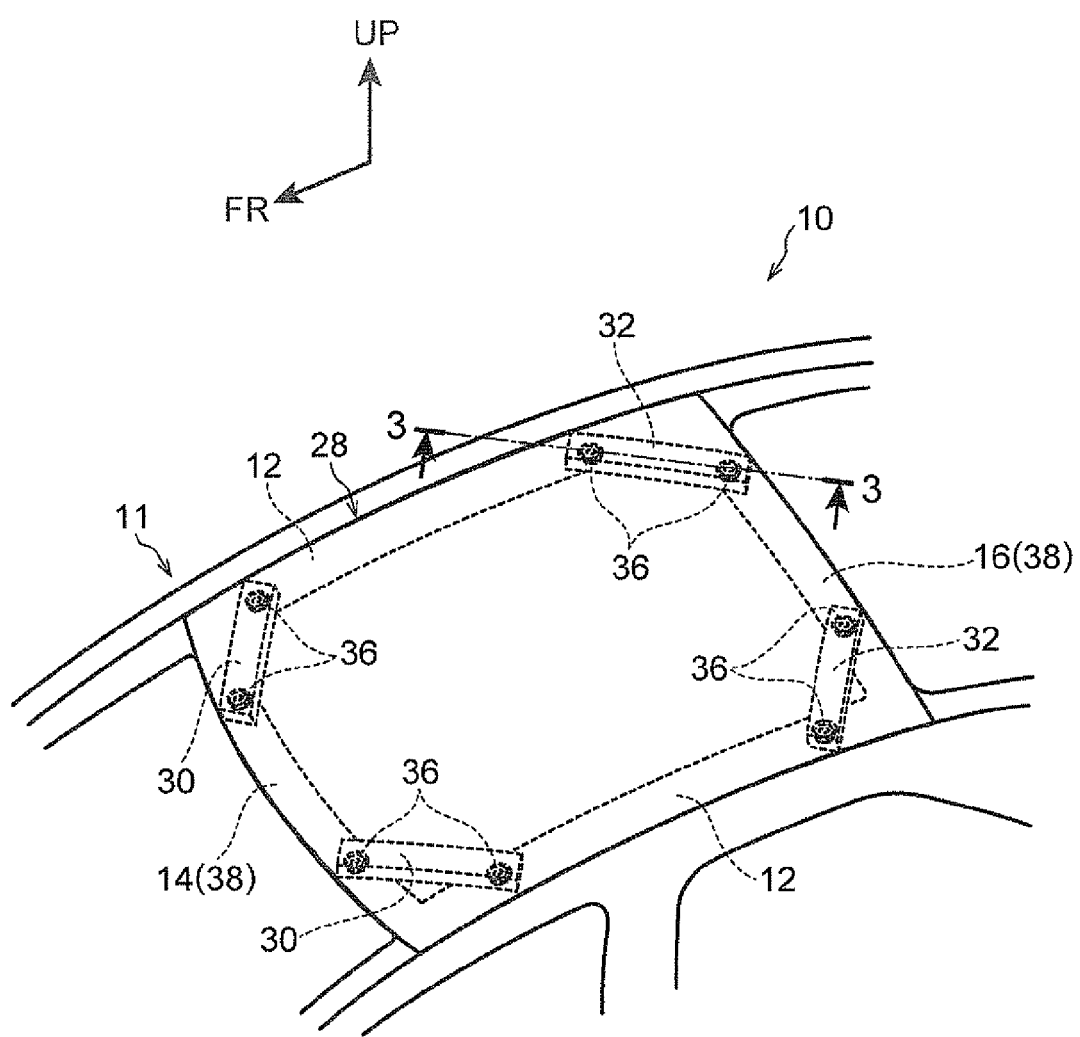
FIG. 2 is a schematic perspective view showing a state in which the roof panel has been joined to the vehicular frame member of the vehicular roof structure pertaining to the embodiment.

In FIG. 1, there is shown a schematic exploded perspective view of a metal vehicular frame member 11 and a resin roof panel 28 serving as a panel member positioned at the upper portion of a vehicle, with the vehicular frame member 11 and the roof panel 28 configuring a vehicular roof structure 10 serving as a vehicular panel structure, and in FIG. 2, there is shown a state in which the roof panel 28 has been joined to the vehicular frame member 11.

As shown in FIG. 1, a left and right pair of roof side rails 12 serving as side members are disposed extending along the vehicle front-and-rear direction on both vehicle width direction end portions of the vehicular frame member 11. Further, a front header 14 and a rear header 16 serving as cross members are disposed extending along the vehicle width direction on a vehicle front end portion and rear end portion of the vehicular frame member 11 and bridge the pair of roof side rails 12.

Figure 3:
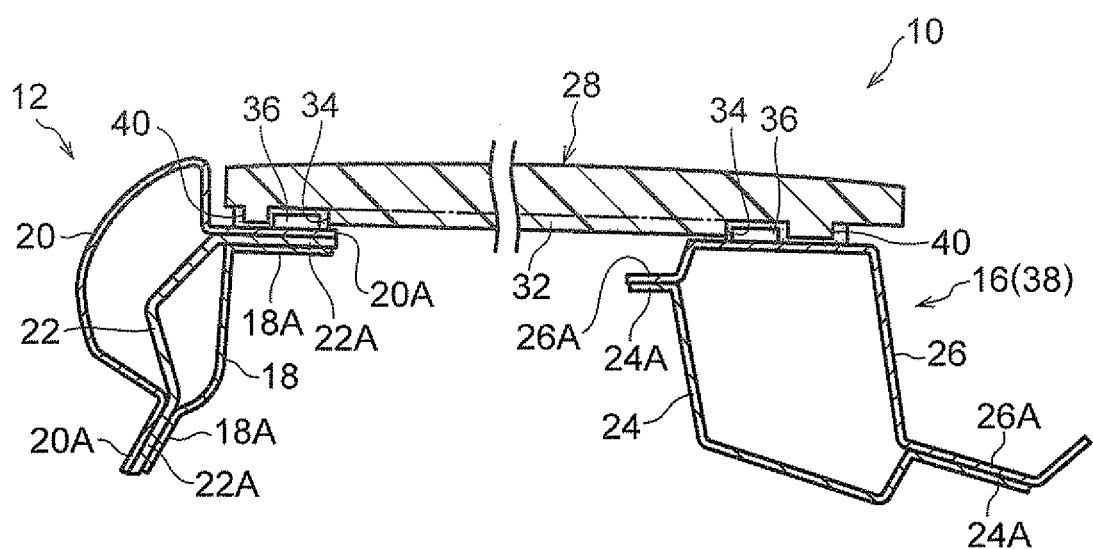
FIG. 3 is a cross-sectional view along line 3-3 of FIG. 2.

In FIG. 3, there is shown a cross-sectional view along 3-3 of FIG. 2. As shown in FIG. 3, each of the roof side rails 12 is disposed with a roof side rail inner member 18 placed on a cabin inner side and a roof side rail outer member 20 placed on a cabin outer side, and a roof side reinforcement member 22 is disposed between the roof side rail inner member 18 and the roof side rail outer member 20.

Flange portions 18A, 22A, and 20A are disposed on both vehicle width direction end portions of the roof side rail inner member 18, the roof side reinforcement member 22, and the roof side rail outer member 20, respectively, and the flange portions 18A, 22A, and 20A are joined to each other. Because of this, a closed cross section is formed between the roof side rail inner member 18 and the roof side reinforcement member 22, and a closed cross section is formed between the roof side reinforcement member 22 and the roof side rail outer member 20.

As shown in FIG. 2 and FIG. 3, each of the front header 14 and the rear header 16 (in FIG. 3, the rear header 16 side is shown) is disposed with a header lower member 24 placed on the cabin inner side and a header upper member 26 placed on the cabin outer side. Flange portions 24A and 26A are disposed on both vehicle front-and-rear direction end portions of the header lower member 24 and the header upper member 26, respectively, and the flange portions 24A and 26A are joined to each other. Because of this, a closed cross section is formed between the header lower member 24 and the header upper member 26.

Here, prismatic ribs 30 serving as high-rigidity portions are disposed integrally with the roof panel 28 on corner portions on the vehicle front end side of an undersurface side (the opposite side of the design surface) of the roof panel 28 in such a way as to straddle spaces between the front header 14 and the roof side rails 12 that the ribs 30 face. Further, like the ribs 30, prismatic ribs 32 serving as high-rigidity portions are formed on corner portions on the vehicle rear end side of the roof panel 28 in such a way as to straddle spaces between the rear header 16 and the roof side rails 12. The vehicle front end side and the vehicle rear end side of the roof panel 28 have substantially identical configurations, so the ribs 32 on the vehicle rear end side of the roof panel 28 will be described below.

Engaging holes 34 formed in substantially cylindrical shapes are formed as recessed portions in both lengthwise direction end sides of each of the ribs 32. Weld nuts 36 serving as engaged portions are welded to the upper surface of the header upper member 26 of the rear header 16 and the upper surfaces of the flange portions 20A disposed in the roof side rail outer members 20 of the roof side rails 12. The engaging holes 34 are disposed in positions opposing the weld nuts 36, and the weld nuts 36 are made insertable into (made engageable with) the engaging holes 34.

Additionally, in a state in which the engaging holes 34 in the roof panel 28 and the weld nuts 36 on the headers 38 (the front header 14 and the rear header 16) and the roof side rails 12 have been caused to engage with each other, the roof panel 28 is joined (secured) to the headers 38 and the roof side rails 12 via an adhesive 40 disposed on the peripheral edge side of the roof panel 28. Here, as shown in FIG. 3, the adhesive 40 is also disposed on the lengthwise direction outer sides of the ribs 32 and in spaces arising between the engaging holes 34 and the weld nuts 36.

Action and Effects of Vehicular Roof Structure

Next, the action and effects of the vehicular panel structure pertaining to the present embodiment will be described.

As shown in FIG. 1, in the present embodiment, the ribs 30 and 32 are formed on each of the corner portions on the undersurface side of the roof panel 28 in such a way as to straddle the spaces between the headers 38 (the front header 14 and the rear header 16) and the roof side rails 12. Additionally, the engaging holes 34 are formed in both lengthwise direction end sides of each of the ribs 32 (regarding the ribs 30, description will be omitted because they have a configuration that is substantially identical to that of the ribs 32), and the weld nuts 36 disposed on the headers 38 and the roof side rails 12 are engaged with the engaging holes 34.

In this way, because the ribs 32 are disposed on the roof panel 28, the thickness of the sections where the ribs 32 are disposed becomes thicker than the thickness of other sections of the roof panel 28. Because of this, the roof panel 28 can be reinforced and the rigidity of the roof panel 28 can be raised. Consequently, vehicle rigidity becomes higher and steering stability and NV performance improve.

Here, regarding changes in the angles between the headers 38 and the roof side rails 12, in addition to the angles between the headers 38 and the roof side rails 12 as seen in a vehicle plan view, the same is also true regarding the angles between the headers 38 and the roof side rails 12 as seen in a vehicle side view. For this reason, even if one side of the vehicle were to run over a bump during travel, torsional deformation of the vehicle via the vehicle frame member 11, such as the headers 38 and the roof side rails 12, is prevented or suppressed.

Further, the headers 38 and the roof side rails 12 are interconnected by causing the engaging holes 34 formed in the ribs 32 disposed on the roof panel 28 to engage with the weld nuts 36 disposed on the headers 38 and the roof side rails 12. For this reason, in a case where a compressive load or a tensile load has acted between the headers 38 and the roof side rails 12, a reaction force with respect to the compressive load or the tensile load can be obtained with the ribs 32 via the weld nuts 36 and the engaging holes 34.

Figure 4A:
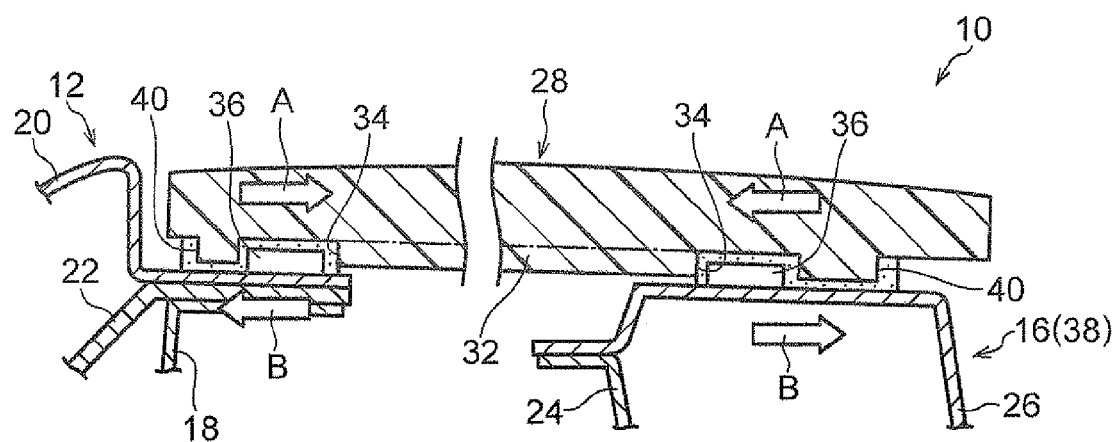
FIG. 4A is an enlarged cross-sectional view corresponding to FIG. 3 describing the action of the vehicular roof structure pertaining to the embodiment.

That is, as shown in FIG. 4A, in a case where a compressive load (the direction of arrows A) has acted between the headers 38 and the roof side rails 12, the headers 38 or the roof side rails 12 try to deform in the direction in which the angles formed by the headers 38 and the roof side rails 12 become narrower. For this reason, the compressive load acts on the ribs 32 (the inner sides of the engaging holes 34) via the weld nuts 36 and the engaging holes 34, but because the ribs 32 are high-rigidity portions, a reaction force (the direction of arrows B) with respect to the compressive load can be obtained via the ribs 32.

Figure 4B:
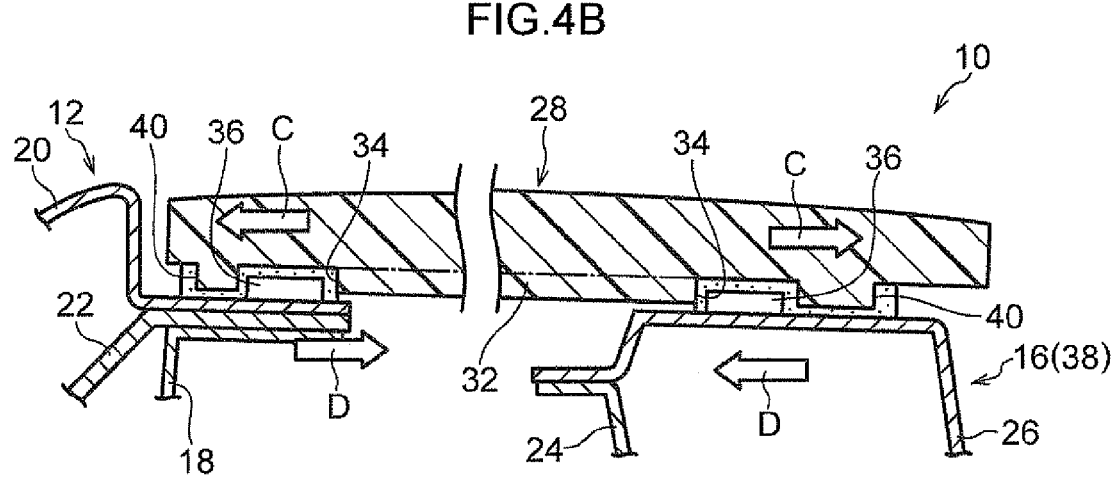
FIG. 4B is an enlarged cross-sectional view corresponding to FIG. 3 describing the action of the vehicular roof structure pertaining to the embodiment.

As shown in FIG. 4B, in a case where a tensile load (the direction of arrows C) has acted between the headers 38 and the roof side rails 12, the headers 38 or the roof side rails 12 try to deform in the direction in which the angles formed by the headers 38 and the roof side rails 12 become wider. For this reason, the tensile load acts on the ribs 32 (the outer sides of the engaging holes 34) via the weld nuts 36 and the engaging holes 34, but because the ribs 32 are high-rigidity portions, a reaction force (the direction of arrows D) with respect to the tensile load can be obtained via the ribs 32.

Here, the adhesive 40 is disposed on the lengthwise direction outer sides of the ribs 32 and in the spaces arising between the engaging holes 34 and the weld nuts 36. In a case where a compressive load and a tensile load have acted on the ribs 32 via the weld nuts 36 and the engaging holes 34 between the headers 38 and the roof side rails 12, a reaction force with respect to the compressive load and the tensile load can be obtained with the adhesive 40. In particular, by disposing the adhesive 40 on the lengthwise direction outer sides of the ribs 32, the reaction force (the direction of arrows D) with respect to the tensile load can be increased.

From the above, even when resin is used for the roof panel 28, the angles formed by the headers 38 and the roof side rails 12 become maintained via the ribs 32 and the adhesive 40 disposed on the roof panel 28. Consequently, changes in the angles between the headers 38 and the roof side rails 12 are prevented or suppressed.

Further, the ribs 32 are disposed integrally with the roof panel 28. Because of this, secondary processing such as integrating the two parts, for example, becomes unnecessary and a reduction in cost can be achieved, but of course the ribs 32 may also be molded separately from the roof panel 28 and thereafter integrated with the roof panel 28. In this case, it becomes possible to change the materials between the ribs 32 and the roof panel 28.

Further, in the present embodiment, the panel member is the roof panel 28, so torsional deformation of the cabin can be prevented or suppressed. Further, the roof panel 28 has a simple shape compared to that of a back door, for example, and is less subject to design or functional limitations in the positions where the ribs 30 and 32 are disposed, so it can sufficiently exhibit the function of suppressing changes in angles between vehicle frame members.

Other Embodiments (1) In the present embodiment, as shown in FIG. 3, the weld nuts 36 are welded to the upper surfaces of the headers 38 and the roof side rails 12, and the ribs 32 disposed on the roof panel 28 are engaged therewith, but the invention is not limited to this because it suffices as long as the headers 38 and the roof side rails 12 can be interconnected by the ribs 32.

For example, as shown in FIG. 5, weld bolts 42 serving as through members may also be used instead of the weld nuts 36, and head portions 42A of the weld bolts 42 may serve as engaged portions and be caused to engage with the engaging holes 34. In this case, through holes 44 into which the weld bolts 42 are inserted are formed in the header upper members 26 of the headers 38, in the flange portions 20A disposed at the roof side rail outer members 20 of the roof side rails 12, in the flange portions 22A disposed at the roof side reinforcement members 22 of the roof side rails 12, and in the flange portions 18A disposed at the roof side rail inner members 18 of the roof side rails 12.

The weld bolts 42 become welded to the headers 38 or the roof side rails 12 in a state in which the weld bolts 42 have been inserted into the through holes 44, but because the weld bolts 46 are fastened by nuts 46, the securing strength (fastening strength) with respect to the headers 38 or the roof side rails 12 improves more with the weld bolts 42 than with the weld nuts 36 (see FIG. 3). Further, because the weld bolts 42 are retained via the nuts 46, uplift of the roof panel 28 can be prevented or suppressed via the heads portions 42A of the weld bolts 42, the engaging holes 34 in the ribs 32, and the adhesive 40.

Further, here, the weld bolts 42 are used; however, although it is not shown in the drawings, weld nuts may also be welded beforehand to the header lower members 24 in the positions where the through holes 44 are formed, and the bolts may be fastened to the weld nuts. As shown in FIG. 5, in the case of fastening the nuts 46 to the weld bolts 42, work holes (not shown in the drawings) for fastening the nuts 46 become necessary in the header lower members 24 of the headers 38, but in the case of welding weld nuts beforehand to the header lower members 24 and fastening the bolts to the weld nuts as described above, work holes are unnecessary and workability is also good. Moreover, in addition to the weld nuts 36 and the weld bolts 42, although it is not shown in the drawings, cylindrical pins serving as engaged portions may also be disposed on the headers 38 and the roof side rails 12, and round holes into which the pins are inserted may also be formed as engaging portions in the ribs 32.

(2) Further, in addition to this, as shown in FIG. 6, the invention may also have a configuration where engaging projections 50 serving as projections formed integrally with ribs 48 are disposed on both end sides of the ribs 48 serving as high-rigidity portions. The engaging projections 50 are made insertable into through holes 44 formed in the headers 38 and the roof side rails 12, and substantially disc-shaped claw portions 52 whose outer diameter dimension is larger than the inner diameter dimension of the through holes 44 are formed on distal end portions of the engaging projections 50.

The claw portions 52 are configured by plural claws, for example, and spaces are disposed between adjacent claws. For this reason, the configuration is one where, when the claw portions 52 pass through the through holes 44, the spaces between adjacent claws become filled and the claw portions 52 become reduced in diameter, the claw portions 52 return to their initial state when the claw portions 52 pass through the through holes 44, and the claw portions 52 become locked and retained on peripheral edge portions of the through holes 44 serving as engaged portions.

That is, the headers 38 and the roof side rails 12 are interconnected by the ribs 48 via the through holes 44 and the claw portions 52. In this case, separate members for interconnecting the headers 38 and the roof side rails 12, such as the weld nuts 36 (see FIG. 3) and the weld bolts 42 (see FIG. 5), become unnecessary, and a reduction in cost can be achieved.

(3) Moreover, in the embodiment described above, as shown in FIG. 3, a configuration where the headers 38 and the roof side rails 12 are interconnected by the ribs 32 has been described, but the invention is not limited to this because it suffices as long as changes in the angles formed by the headers 38 and the roof side rails 12 can be suppressed. For example, the invention may also have a configuration where ribs enter in between the headers 38 and the roof side rails 12.

Figure 7:
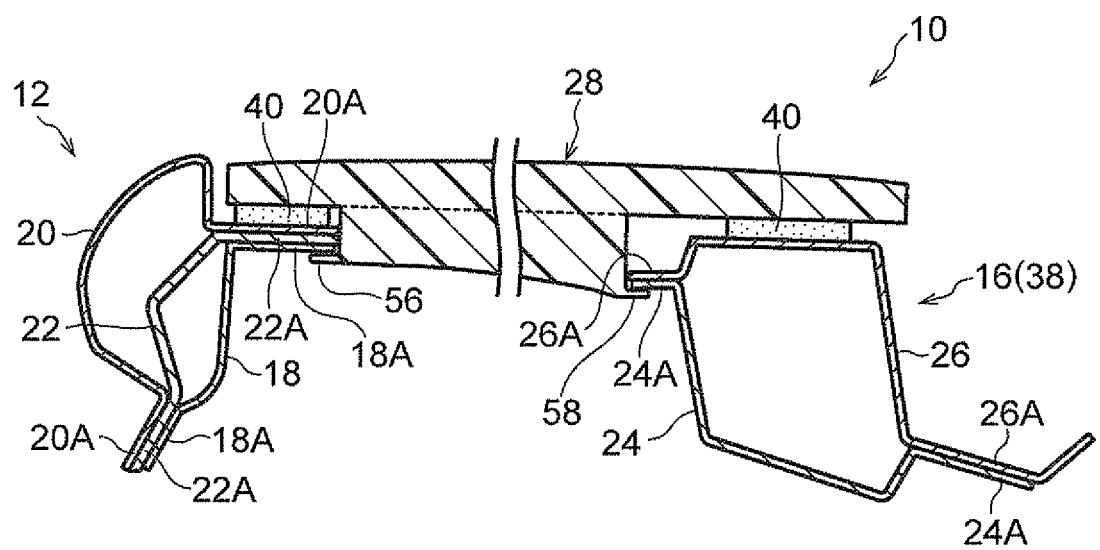
FIG. 7 is a cross-sectional view corresponding to FIG. 3 showing another embodiment (3) of the vehicular roof structure pertaining to the embodiment.

For example, as shown in FIG. 7, the invention may also be configured in such a way that receiving portions 56 and 58 stick out from both end portions of ribs 54 serving as high-rigidity portions along the lengthwise direction of the ribs 54, the receiving portions 56 are placed under the flange portions 18A of the roof side rail inner members 18, and the receiving portions 58 are placed under the flange portions 24A of the header lower members 24. Additionally, the distal end surfaces of the flange portions 20A, 22A, and 18A oppose one lengthwise direction end surface of the ribs 54, the distal end surfaces of the flange portions 26A and 24A oppose the other lengthwise direction end surfaces of the ribs 54, and the roof panel 28, the headers 38, and the roof side rails 12 are joined together by the adhesive 40.

In this case, in a case where a tensile load has acted between the headers 38 and the roof side rails 12, a reaction force resulting from the ribs 54 is not obtained and only a reaction force resulting from the adhesive 40 acts on the headers 38 and the roof side rails 12, but in a case where a compressive load has acted between the headers 38 and the roof side rails 12, the flange portions 20A, 22A, and 18A of the roof side rails 12 are in contact with the end surfaces of the ribs 54 in a state in which they are supported by the receiving portion 56 and the flange portions 26A and 24A of the headers 38 are in contact with the end surfaces of the ribs 54 in a state in which they are supported by the receiving portion 58, and because of this, changes in the angles formed by the headers 38 and the roof side rails 12 can be suppressed.

Supplemental Description of Present Embodiment

In the present embodiment, the hole shape of the engaging holes 34 shown in FIG. 1 has been given a substantially cylindrical shape, but the engaging holes 34 may also be given an angular shape to match the outer shape of the weld nuts 36. In this case, the ribs 32 are stopped from turning with respect to the weld nuts 36 in a state in which the engaging holes 34 are engaged with the weld nuts 36.

Further, in the present embodiment, the front header 14 and the rear header 16 have been described as the headers 38, but the vehicular roof structure pertaining to the present embodiment may also be applied at least to just the rear header 16 side in a hatchback type of vehicle. In a sedan type of vehicle, there are few differences in deformation between the vehicle front side and the vehicle rear side of the vehicle frame member, but in a hatchback type of vehicle, the vehicle rear side of the vehicle frame member tends to deform more easily than the vehicle front side of the vehicle frame member.

For this reason, by reinforcing at least the rear header 16 side in a hatchback type of vehicle, the effect of suppressing, with the necessary minimum configuration, deformation of angles formed between vehicle frame members can be obtained. For this reason, a reduction in cost can be achieved compared to the case of reinforcing the front header 14 and rear header 16 sides.

Moreover, in the present embodiment, the front header 14 and the rear header 16 have been described as the cross members, but in a case where a roof reinforcement member (not shown in the drawings) is disposed in the substantial center portion in the vehicle front-and-rear direction, the vehicular panel structure pertaining to the present embodiment may also be applied to that roof reinforcement member.

Figure 8A:
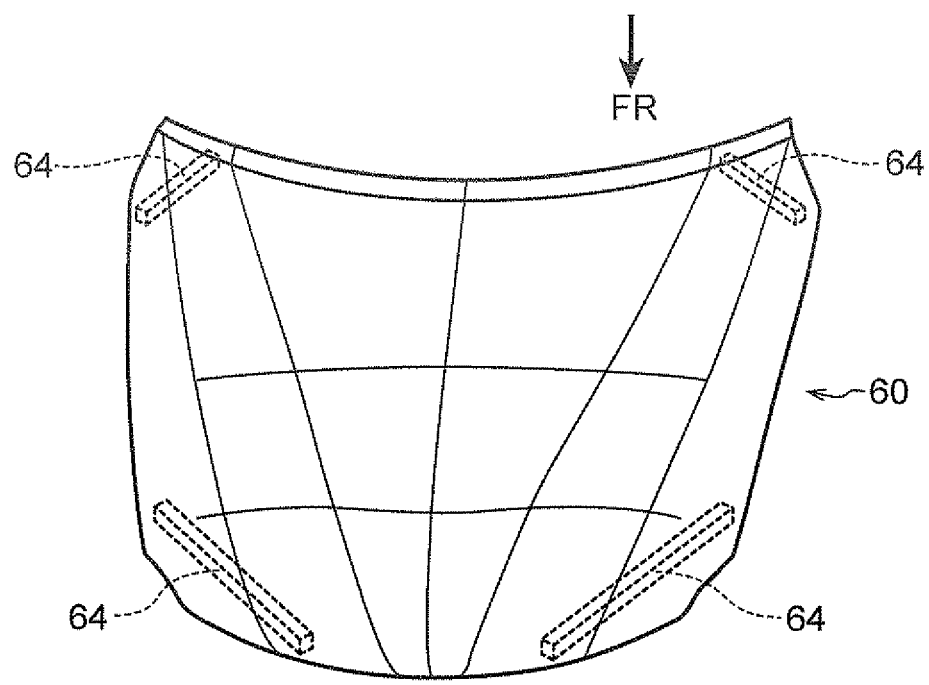
FIG. 8A is a schematic plan view of a hood showing a modification of the vehicular panel structure pertaining to the embodiment.
Figure 8B:
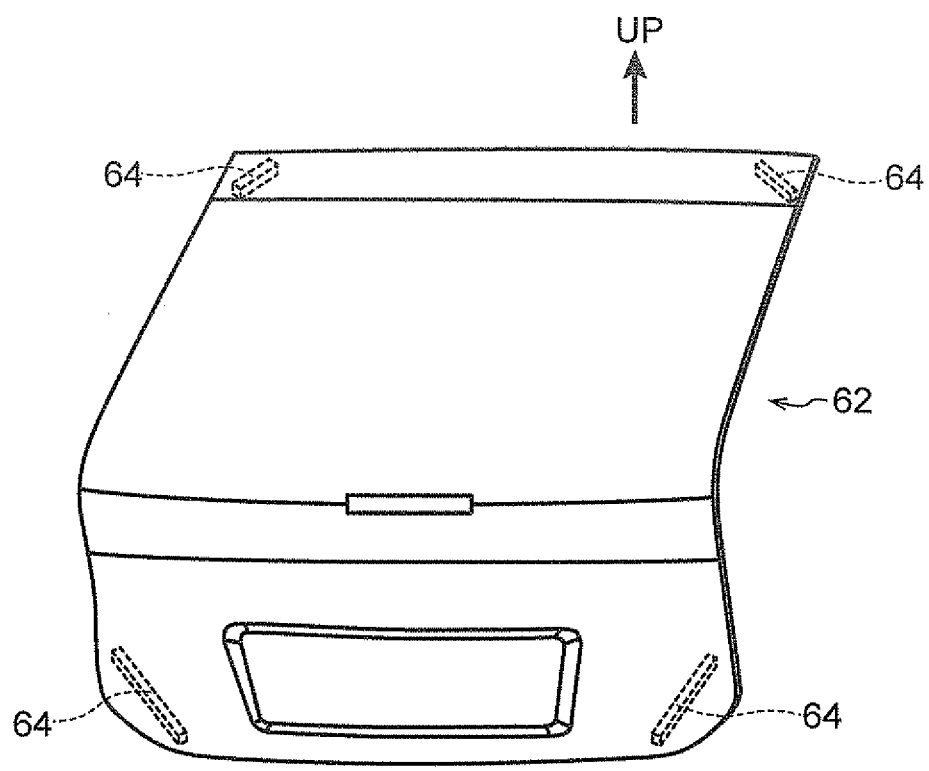
FIG. 8B is a schematic perspective view of a back door showing a modification of the vehicular panel structure pertaining to the embodiment.

Further, in the present embodiment, the roof panel 28 has been described as the panel member, but the invention is applicable as long as the place is a place where a resin panel is joined to a vehicle frame member. Examples other than the roof panel 28 include a hood 60 shown in FIG. 8A and a back door 62 shown in FIG. 8B, and ribs 64 serving as high-rigidity portions are disposed in corner portions on undersurface sides of the hood 60 and the back door 62. Here, regarding the side members of the back door 62, "disposed extending along the vehicle front-and-rear direction" includes a case where the side members are disposed in a direction sloping downward of the vehicle heading toward the vehicle rear side, but it also includes a case where the side members are disposed extending only along the vehicle up-and-down direction.

Moreover, it goes without saying that the present invention can be implemented in a variety of aspects without departing from the gist of the present invention.

The invention claimed is:

1. A resin roof panel structure applied to a vehicle equipped with:
    a pair of side members that configure a vehicle frame member and are disposed extending along a vehicle front-and-rear direction; and
    cross members that configure the vehicle frame member, are disposed extending along a vehicle width direction, and bridge across between the pair of side members,
    the resin roof panel structure comprising:
    a resin roof panel that is joined to the vehicle frame member; and
    ribs that are projectingly disposed at corner portions on an undersurface side of the roof panel in positions straddling the side members and the cross members, and that impart higher rigidity to the roof panel than is present in other sections of the roof panel, wherein the ribs are provided discontinuously around the roof panel.

2. The resin roof panel structure according to claim 1, wherein engaging portions that engage with engaged portions disposed on the side members and the cross members are disposed in the ribs.

3. The resin roof panel structure according to claim 2, wherein:
    the engaged portions are head portions disposed on through members that penetrate and are retained in through holes formed in the side members or the cross members, with the head portions projecting from surfaces of the side member or the cross members; and
    the engaging portions are recessed portions into which the head portions are inserted.

4. The resin roof panel structure according to claim 2, wherein:
    the engaged portions are peripheral edge portions of through holes formed in the side members or the cross members; and
    the engaging portions are projections that penetrate the through holes and lock onto the peripheral edge portions of the through holes.

5. The resin roof panel structure according to claim 1, wherein an adhesive is applied to lengthwise direction outer sides of the ribs.

6. The resin roof panel structure according to claim 1, wherein the cross members are configured to include a front header portion placed at a front end portion of the roof panel and a rear header portion placed at a rear end portion of the roof panel, and the ribs are disposed at least on the rear header portion.

7. The resin roof panel structure according to claim 1, wherein an adhesive is applied to lengthwise direction outer sides of the ribs.

8. The resin roof panel structure according to claim 2, wherein an adhesive is applied to lengthwise direction outer sides of the ribs.

9. The resin roof panel structure according to claim 3, wherein an adhesive is applied to lengthwise direction outer sides of the ribs.

10. The resin roof panel structure according to claim 1, wherein the cross members are configured to include a front header portion placed at a front end portion of the roof panel and a rear header portion placed at a rear end portion of the roof panel, and the ribs are disposed at least on the rear header portion.

11. The resin roof panel structure according to claim 2, wherein the cross members are configured to include a front header portion placed at a front end portion of the roof panel and a rear header portion placed at a rear end portion of the roof panel, and the ribs are disposed at least on the rear header portion.

12. The resin roof panel structure according to claim 3, wherein the cross members are configured to include a front header portion placed at a front end portion of the roof panel and a rear header portion placed at a rear end portion of the roof panel, and the ribs are disposed at least on the rear header portion.

13. The resin roof panel structure according to claim 4, wherein the cross members are configured to include a front header portion placed at a front end portion of the roof panel and a rear header portion placed at a rear end portion of the roof panel, and the ribs are disposed at least on the rear header portion.

* * * * *